United States Patent
LaBute et al.

(10) Patent No.: US 10,761,897 B2
(45) Date of Patent: Sep. 1, 2020

(54) PREDICTIVE MODEL-BASED INTELLIGENT SYSTEM FOR AUTOMATICALLY SCALING AND MANAGING PROVISIONED COMPUTING RESOURCES

(71) Applicant: Workday, Inc., Pleasanton, CA (US)

(72) Inventors: Montiago Xavier LaBute, Oakley, CA (US); Teng Qu, Berkeley, CA (US); James Michael Stratton, Danville, CA (US); Xiaoqun Joyce Duan, San Francisco, CA (US); Alex James Boyd, Longview, WA (US)

(73) Assignee: Workday, Inc., Pleasanton, CA (US)

( * ) Notice: Subject to any disclaimer, the term of this patent is extended or adjusted under 35 U.S.C. 154(b) by 212 days.

(21) Appl. No.: 15/887,889

(22) Filed: Feb. 2, 2018

(65) Prior Publication Data

US 2019/0243691 A1    Aug. 8, 2019

(51) Int. Cl.
*G06F 9/50* (2006.01)
*H04L 12/911* (2013.01)
(Continued)

(52) U.S. Cl.
CPC ............ *G06F 9/5077* (2013.01); *G06F 9/505* (2013.01); *G06N 3/0454* (2013.01); *H04L 43/08* (2013.01); *H04L 47/70* (2013.01)

(58) Field of Classification Search
CPC ...... G06F 9/5005; G06F 9/505; G06F 9/5077; G06F 9/45558; G06F 13/16; G06F 16/739; G06F 16/785; G06F 2009/4557; G06F 2009/45595; G06F 3/0619; G06F 3/065; G06F 3/067; G06F 8/443; G06F 8/60; G06F 8/658; G06F 8/71; G06F 9/5016;
(Continued)

(56) References Cited

U.S. PATENT DOCUMENTS 6,941,365 B2   9/2005 Sirgany
7,757,214 B1   7/2010 Palczak
(Continued)

OTHER PUBLICATIONS

Energy-Efficient Thread Assignment Optimization for Heterogeneous Multicore Systems, Vinicius Petrucci, University of Michigan , ACM Transactions on Embedded Computing Systems, vol. 14, No. 1, Article 15, Publication date: Jan. 2015. (Year: 2015).*

*Primary Examiner* — Djenane M Bayard
(74) *Attorney, Agent, or Firm* — Van Pelt, Yi & James LLP

(57) ABSTRACT

A system for automatically scaling provisioned resources includes an input interface and a processor. The input interface is configured to receive an estimate of a required number of processing threads. The processor is configured to determine required resources for processing the required number of processing threads using a model; provision the required resources; indicate to execute client tasks using the provisioned resources; determine server telemetry or logging data for the provisioned resources; provide the server telemetry or the logging data to the model; determine a resource utilization score based at least in part on the server telemetry or the logging data; determine a provisioning performance reward based at least in part on the resource utilization score; and adjust model parameters using the provisioning performance reward.

20 Claims, 10 Drawing Sheets

(51) Int. Cl.
*G06N 3/04* (2006.01)
*H04L 12/26* (2006.01)

(58) Field of Classification Search
CPC ............ G06F 11/1076; G06F 11/3433; G06F
16/172; G06F 16/61; G06F 19/3475;
G06F 19/3481; G06F 2009/45587; G06F
21/556; G06F 21/577; G06F 2209/5011;
G06F 2209/5019; G06F 2209/5021; G06F
2211/1061; G06F 2212/602; G06F
2212/6024; G06F 2212/6026; G06F
8/445; G06F 9/3808; G06F 9/3822; G06F
9/4856; G06F 9/4881; G06F 9/50; G06F
9/5011; G06F 9/5027; G06F 9/5038;
G06F 9/5061; G06F 9/5088; H04L
41/0823; H04L 41/145; H04L 41/147;
H04L 43/08; H04L 47/70; H04L 67/306;
H04L 65/608; H04L 41/0806; H04L
41/0896; H04L 41/5025; H04L 41/5041;
H04L 41/5096; H04L 47/72; H04L
47/785; H04L 47/805; H04L 63/20; H04L
67/1004
See application file for complete search history.

(56) References Cited

U.S. PATENT DOCUMENTS

| | | | |
|---|---|---|---|
| 8,032,875 B2 | 10/2011 | Kosche | |
| 8,185,909 B2 | 5/2012 | Sigal | |
| 8,429,097 B1 | 4/2013 | Sivasubramanian | |
| 8,589,549 B1 | 11/2013 | Vermeulen | |
| 8,850,449 B2 | 9/2014 | Hiltunen | |
| 10,409,642 B1* | 9/2019 | Tang | G06F 9/5005 |
| 2005/0055426 A1 | 3/2005 | Smith | |
| 2012/0246638 A1 | 9/2012 | He | |
| 2013/0086273 A1* | 4/2013 | Wray | G06F 9/5072 |
| | | | 709/226 |
| 2013/0212277 A1 | 8/2013 | Bodik | |
| 2016/0070601 A1 | 3/2016 | Yamamoto | |
| 2016/0301624 A1 | 10/2016 | Gonzalez | |
| 2017/0214632 A1* | 7/2017 | Ravi | G06F 16/24578 |
| 2019/0325370 A1* | 10/2019 | Das | G06F 11/3442 |

* cited by examiner

Task Queue = 2, 5, 4, 7, 1, 3, 8

Thread Capacity = 10

PREDICTIVE MODEL-BASED INTELLIGENT SYSTEM FOR AUTOMATICALLY SCALING AND MANAGING PROVISIONED COMPUTING RESOURCES

BACKGROUND OF THE INVENTION

Scalable computing systems comprise a set of computers configured to process computing jobs. Computers may be added to the system or removed from the system as the demand changes. The resource load on a scalable computing system for processing database system jobs can be extremely spiky, as large jobs come and go. When a request for a large job is received, preparing the system to perform the large job can take a great deal of time, as additional computers are brought up and data for processing transferred to them. This slowdown lowers the overall efficiency of the scalable computing system and its ability to process large jobs on demand.

BRIEF DESCRIPTION OF THE DRAWINGS

Various embodiments of the invention are disclosed in the following detailed description and the accompanying drawings.

DETAILED DESCRIPTION

Figure 1:
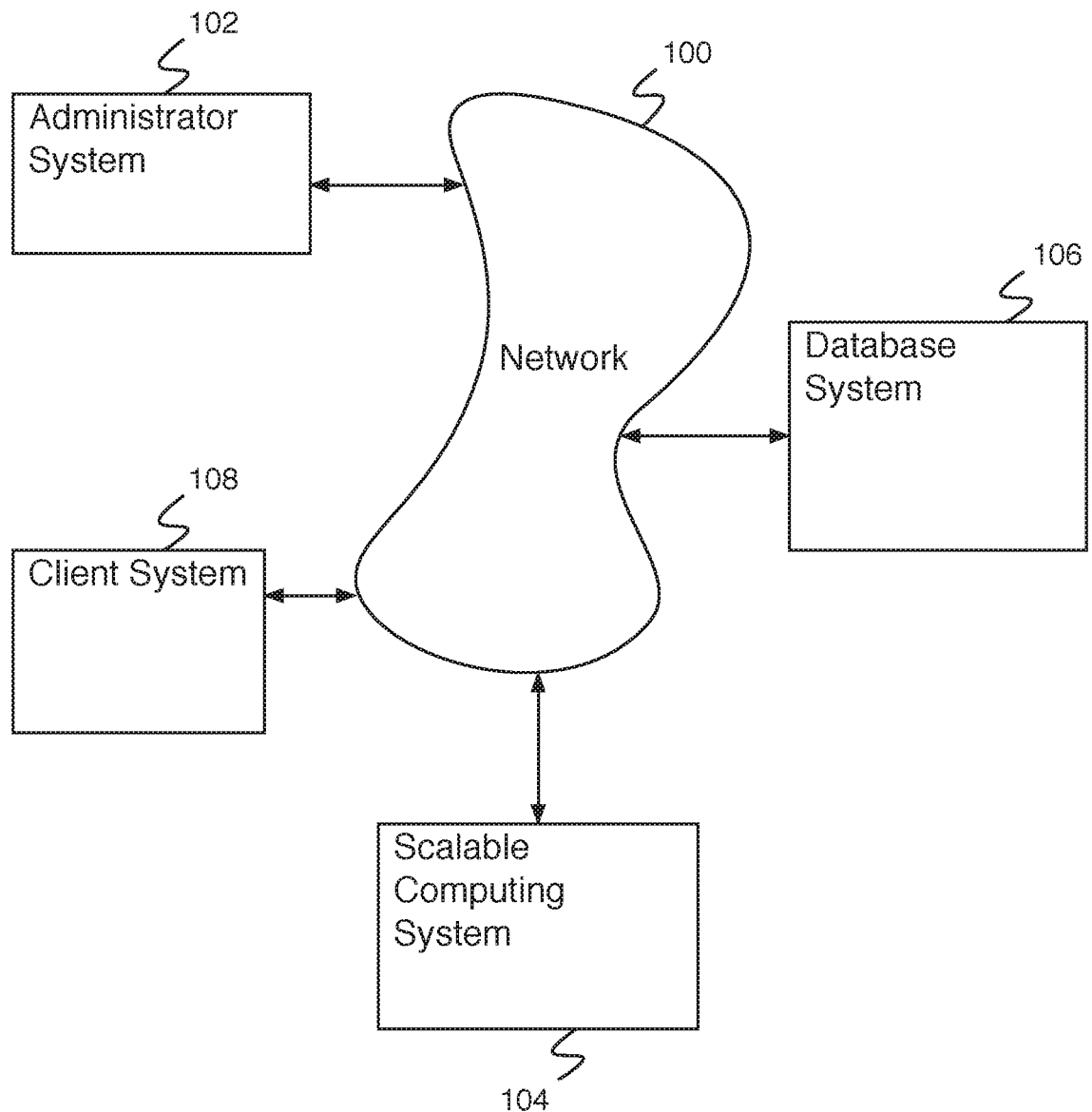
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for automatically scaling provisioned resources is disclosed. The system comprises an input interface and a processor. The input interface is configured to receive an estimate of a required number of processing threads. The processor is configured to determine required resources for processing the required number of processing threads using a model, provision the required resources, indicate to execute client tasks using the provisioned resources, determine server telemetry or logging data for the provisioned resources, provide the server telemetry or logging data to the model, determine a resource utilization score based at least in part on the server telemetry or logging data, determine a provisioning performance reward based at least in part on the resource utilization score, and adjust model parameters using the provisioning performance reward. The system for automatically scaling provisioned resources additionally comprises a memory coupled to the processor and configured to provide the processor with instructions.

A system for automatically scaling provisioned resources automatically adjusts resource provisioning using a model. The system receives an estimate of a required number of processing threads. The estimate is based at least in part on a resource usage history (e.g., resources that are typically used at the same time of day, at the same day of the week, at the same day of the month, at the same day of the year, etc.). A model is used to determine required resources for processing the required number of processing threads. The model performs the determination of required resources based on the required number of processing threads and additionally on previously determined server telemetry/logging data for provisioned resources. The model comprises a software model, for example, an algorithm, a neural network, a machine learning model, etc. The system then provisions the required resources determined by the model. Provisioning required resources comprises indicating to a server system (e.g., a scalable computing system, a cloud computing system, a flexible server system, etc.) to activate the required resources. Once the resources are ready, the system indicates to execute client tasks using the resources.

As the provisioned resources execute the client tasks, the system for automatically scaling provisioned resources determines server telemetry/logging data for the provisioned resources. Server telemetry/logging data comprises an average processor load, an average task completion time, an average task queue length, etc. The server telemetry/logging data is provided to the model for use in future determinations of required resources. Additionally, a resource utilization score is determined based at least in part on the server telemetry/logging data. Model parameters are adjusted using the resource utilization score. The resource utilization score comprises a score describing how well the resources are being utilized. In some embodiments, the resource utilization score is in the closed range of [0,1]. For example, a small positive score near zero in the event the resources are underutilized and a positive score near one in the event the resources are overutilized. The score can be nonlinear, asymmetric, discontinuous, etc. For embodiments including a neural network model, the score is used as an input to a reinforcement learning process.

As time passes, the accuracy of the cluster usage predictions can be determined. Feedback on cluster usage is received, comprising indications that additional cluster computers are required, indications that additional cluster data is required, indications that provisioned cluster computers are going unused, etc. The feedback can be analyzed and used to improve the accuracy of future predictions by modifying the prediction algorithm. The computer and cluster performance is improved by appropriately determining resources for the cluster making execution of jobs more efficient and timely as well as resource utilization more appropriate (e.g., using resource when required and not requiring resources when not required).

FIG. 1 is a block diagram illustrating an embodiment of a network system. In some embodiments, the network system of FIG. 1 comprises a system for resource usage prediction for server provisioning. In the example shown, a user using client system 108 submits a job to scalable computing system 104 that involves data stored on the system (e.g., on database system 106). An estimate is received of the required number of processing threads for processing the job (e.g., as determined using the system, based on historic data, etc.). The required resources are determined by scalable computing system 104 using a model. The required resources are provisioned and the job is indicated to be executed using the provisioned resources. As the job is executing, server telemetry/logging data is determined on the provisioned resources (e.g., performance metrics associated with processors, memories, networks, storage, etc.). The model is provided with the server telemetry/logging metrics. Resource utilization is determined based on the server telemetry/logging metrics, and the model is adjusted using the resource utilization. In some cases, scalable computing system 104 and the resources on scalable computing system 104 for executing the job are adjusted based on the model.

Scalable computing system 104 comprises a computing system for processing scalable computing jobs. Processing scalable computing jobs comprises processing software jobs utilizing a scalable computing system (e.g., a computing system that is able to scale its size in response to a required number of jobs to process). Scalable computing system 104 comprises a master system and a server pool comprising a plurality of server systems. The master system comprises a master system for assigning a job to a server system, dividing a job between a set of server systems, assembling job results, querying server system status, etc.

The server systems comprise server systems for processing computing tasks (e.g., reading data, writing data, processing data, etc.). Scalable computing jobs can require processing of stored database data (e.g., database data transferred to the server system from database system 106).

Scalable computing system 104 additionally comprises a provisioning system. The provisioning system comprises a system for receiving an estimate of a required number of processing threads (e.g., based at least in part on a time series of past usage data), determining required resources for processing the required number of processing threads using a model (e.g., a neural network, a machine learning model, etc.), provisioning the required resources (e.g., indicating to the server pool to activate the required resources), and indicating to execute client tasks using the provisioned resources. The provisioning system additionally comprises a system for determining server telemetry/logging data for the provisioned resources (e.g., a metric indicating the utilization performance of the provisioned resources), providing the performance metric data to the model, determining a resource utilization score based at least in part on the performance metric data, and adjusting model parameters using the resource utilization score.

Client system 108 comprises a system for accessing data stored on storage system 106 and requesting computations to be performed using scalable computing system 104. In various embodiments, network 100 provides a means for communicating between administrator system 102, scalable computing system 104, client system 108, and database system 106 and comprises one or more of the following: a local area network, a wide area network, a wired network, a wireless network, the Internet, an intranet, a storage area network, or any other appropriate communication network. Administrator system 102 enables an administrator to maintain scalable computing system 104. Administrator system 102 comprises a system for executing administrator commands, for configuring database system 106 or scalable computing system 104, for querying database system 106 or scalable computing system 104, etc. Database system 106 comprises a storage system for storing data (e.g., client data, administrator data, etc.).

Figure 2:
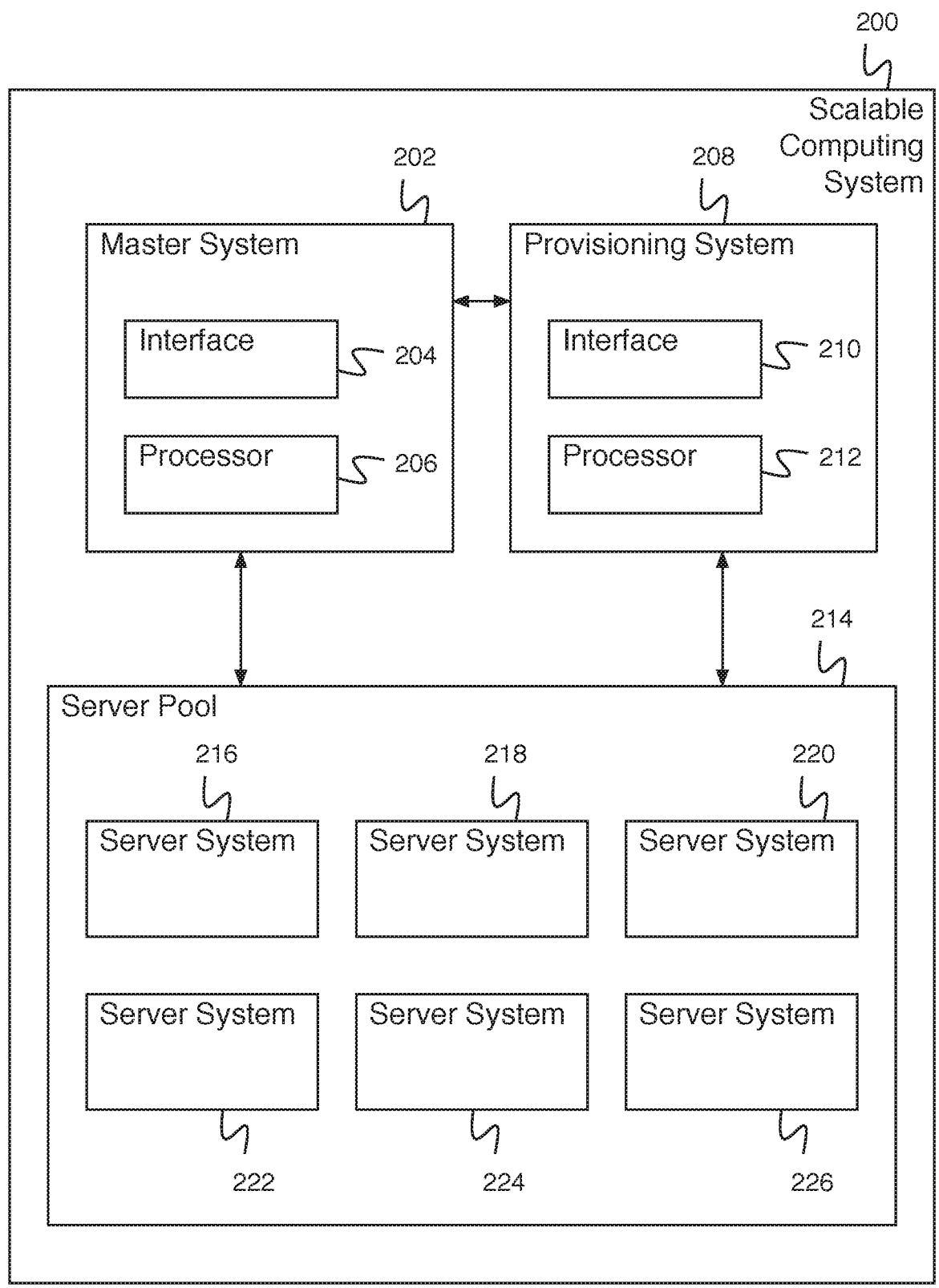
FIG. 2 is a block diagram illustrating an embodiment of a scalable computing system.

FIG. 2 is a block diagram illustrating an embodiment of a scalable computing system. In some embodiments, scalable computing system 200 comprises scalable computing system 104 of FIG. 1. In the example shown, scalable computing system 200 comprises master system 202, provisioning system 208, and server pool 214. Master system 202 comprises a system for interacting with outside systems (e.g., to receive job requests, to provide job results) and for interacting with cluster worker pool 214 (e.g., to provide tasks to server systems, to receive task results from server systems). Master system 202 comprises interface 204 (e.g., for interacting with other systems) and processor 206 (e.g., for processing data). Server pool 214 comprises a plurality of server systems for processing tasks. In the example shown, server pool 214 comprises server system 216, server system 218, server system 220, server system 222, server system 224, and server system 226. Server pool 214 comprises any appropriate number of server systems, and the number of server systems can change dynamically as desired. In some embodiments, server systems of server pool 214 comprise server systems of a plurality of server types. Scalable computing system 200 additionally comprises provisioning system 208. Provisioning system 208 comprises interface 210 (e.g., for interacting with other systems) and processor 212 (e.g., for processing data). Provisioning system 208 comprises a system for estimating a required number of processing threads (e.g., based on previous usage data), for determining required resources for processing the required number of processing threads using a model, for provisioning the required resources (e.g., indicating to server pool 214 to activate the required resources) for indicating to execute client tasks using the provisioned resources (e.g., for indicating to master system 202 to execute the tasks on server pool 214), for determining server telemetry/logging data for the provisioned resources (e.g., by querying server pool 214 directly or via master system 202), for providing the server telemetry/logging data to the model (e.g., for use in determining required resources in a future time iteration), for determining a resource utilization score based at least in part on the server telemetry/logging data, for adjusting model parameters using the resource utilization score, etc. Provisioning system 208 determines an appropriate server pool (e.g., an appropriate configuration of server pool 214) for an upcoming processing demand, and requests to activate an appropriate number of server systems. Provisioning system 208 redetermines the appropriate server pool with a predetermined granularity (e.g., every 5 minutes, every 10 minutes, every 20 minutes, every hour, etc.).

Figure 3:
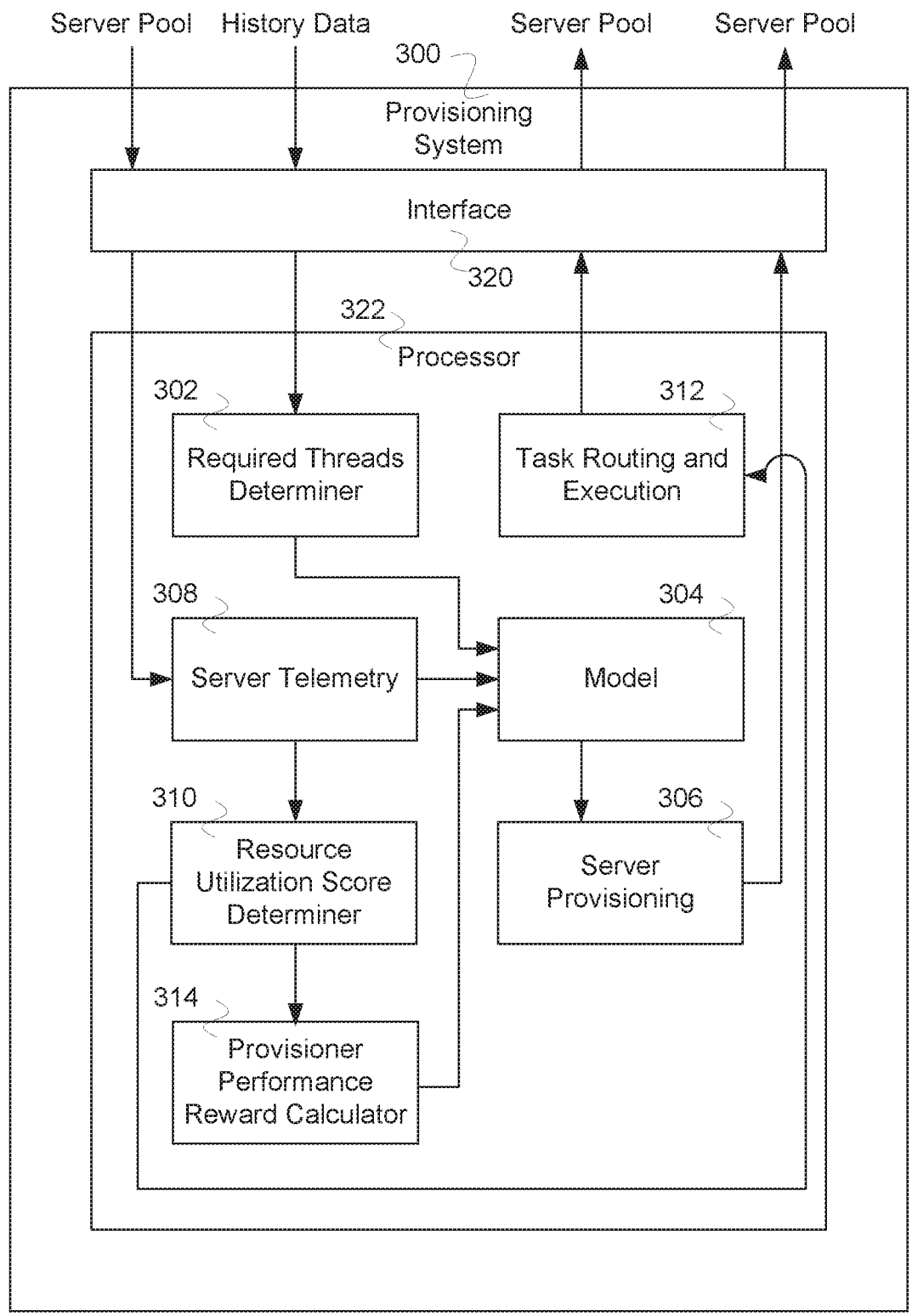
FIG. 3 is a block diagram illustrating an embodiment of a provisioning system in communication with a server pool.

FIG. 3 is a block diagram illustrating an embodiment of a provisioning system in communication with a server pool. In some embodiments, provisioning system 300 comprises provisioning system 208 of FIG. 2. In the example shown, historical data regarding a requested job is received via interface 320 at provisioning system 300 and is used to determine a number of required threads by required threads determiner 302. The number of required threads is provided to model 304 that uses the number of required threads to determine what provisioning action to take. In various embodiments, provisioning actions can include: (1) spinning a server up, (2) spinning a server down, (3) taking no action, or any other appropriate actions. These instructions are passed to server provisioning 306 that provides instructions to a server pool via interface 320 to provision resources to execute tasks. Server telemetry 308 receives server logging data regarding the execution of tasks on the server pool via interface 320 and feeds that to model 304 and resource utilization score determiner 310. A resource utilization score per server is determined and provided from resource utilization score determiner 310 to task routing and execution 312 in order to inform task routing in the server pools (i.e., which servers should tasks be sent to and subsequently executed). The resource utilization score is also sent to provisioner performance reward calculator 314, which determines how effectively model 304 is managing server provisioning. Model 304 produces a provisioning action (e.g., spin-up, spin-down, do nothing, etc.) dependent on the server telemetry 308 produced data and on the seasonality of the thread usage produced by required threads determiner 302. The new provisioning action produced by model 304 is provided to server provisioning 306 to update the provisioning of the server pool.

Provisioning system 300 comprises required threads determiner 302. Required threads determiner 302 determines an estimate of a number of required processing threads at a given time. The estimate is based at least in part on historical usage data (e.g., historical processor queue data). Required threads determiner 302 determines the number of required threads at a regular interval (e.g., a new determination is made every 5 minutes, every 10 minutes, every hour, etc.). In some embodiments, the required number of processing threads comprises a required number of processing threads for a server type of a plurality of server types. In some embodiments, the required number of processing threads is determined using a randomized packing algorithm. Required threads determiner 302 provides multi-scale seasonality (e.g., daily, weekly, monthly, and annually) patterns, learned from the number-of-threads time series determined, to model 304. Model 304 comprises an analytical model, a machine learning model, a neural network, etc. Model 304 determines a provisioning action. In various embodiments, this action comprises: (1) spin servers up, (2) spin servers down, (3) do nothing, or any other appropriate action. The determination of provisioning action is based at least in part on the seasonality of the number of required threads from required threads determiner 302, on server logging/telemetry data from server telemetry 308, on model parameters that are adjusted using a provisioner performance reward produced from the provisioner performance reward calculator 314. In some embodiments, the model parameters might be adjusted using reinforcement learning applied to the provisioner performance rewards produced by provisioner performance calculator 314, rewarding model 304 when it succeeds in keeping the resource utilization score produced in resource utilization score determiner 310 within pre-defined normative bounds (positive rewards) and penalizing model 304 when it fails to keep it within the pre-defined bounds resource utilization score bounds (negative rewards). Model 304 determines the provisioning action at a regular interval (e.g., a new determination is made every 5 minutes, every 10 minutes, every hour, etc.). Server provisioning 306 implements the provisioning action determined by model 304. A provisioning action comprises indicating to a server pool via interface 320 to activate additional numbers of servers or deactivate servers, or do nothing in order to keep receiving positive-valued rewards from provisioner performance calculator 314. The resource utilization score produced by resource utilization score determiner 310 is sent to task routing and execution 312 to inform the routing of tasks to be executed on the server pool. In some embodiments, tasks are typically routed to servers with the lowest resource utilization score for subsequent execution. Task routing and execution 312 can indicate directly to the server pool via interface 320 which servers should receive and execute client tasks and/or to a master system via interface 320 to route and execute client tasks, etc. Indicating to execute client tasks using the provisioned resources causes the client tasks to execute (e.g., on the provisioned resources on a server pool). Client tasks comprise client tasks for a client of a plurality of clients. Server telemetry 308 comprises collecting and aggregating server telemetry/logging data across all provisioned resources. Determining server telemetry/logging data comprises determining a set of server telemetry/logging metrics (e.g., an average processor load, an average task completion time, an average task queue length, etc.). In some embodiments, determining server telemetry/logging data comprises processing the set of server telemetry/logging metrics (e.g., scaling one or more server telemetry/logging metrics, computing a linear or nonlinear function of one or more server telemetry/logging metrics, thresholding one or more server telemetry/logging metrics, processing the set of server telemetry/logging metrics using a model (e.g., a machine learning model, a neural network)). Server telemetry 308 provides the server telemetry/logging metric data to model 304 for use in future determination of provisioning actions and to resource utilization score determiner 310 for use in determining a resource utilization score. A resource utilization score comprises a real-valued number in the range of [0,1], a score produced per server, based at least in part on server telemetry/logging data, which indicates how loaded that server is, as indicated by task queue lengths, task waiting times, task running times, etc. score for adapting a model based at least in part on performance metric data. Provisioner performance reward calculator 314 determines a provisioner performance reward that is based at least in part on any appropriate function of the resource utilization score (e.g., a nonlinear function, a discontinuous function, an asymmetric function, etc.). In some embodiments, the provisioner performance reward comprises a first value in the event that the resource utilization score indicates the provisioned resources are underutilized (e.g., a small negative value), a second value in the event that the resource utilization score indicates the provisioned resources are correctly utilized (e.g., a positive value), and a third value in the event that the resource utilization score indicates the provisioned resources are over-utilized (e.g., a large negative value). The provisioner performance reward is provided to model 304 and used to adjust model parameters (e.g., training a neural network using reinforcement learning).

Figure 4:
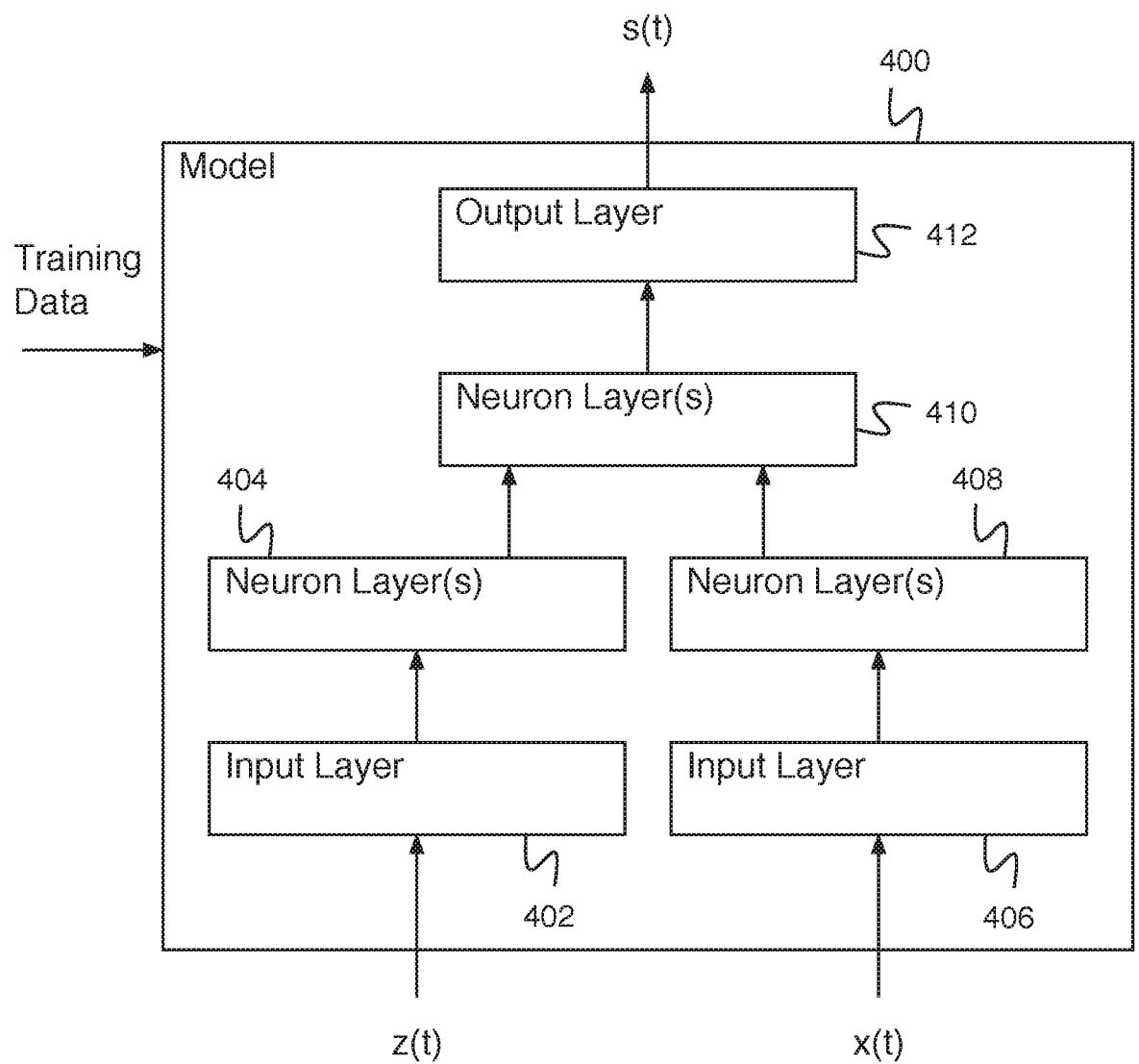
FIG. 4 is a block diagram illustrating an embodiment of a model.

FIG. 4 is a block diagram illustrating an embodiment of a model. In some embodiments, model 400 comprises model 304 of FIG. 3. In the example shown, model 400 comprises a neural network. The neural network comprises two inputs z(t), and x(t). First input z(t) comprises a first input—for example, a number of required threads (e.g., from a required threads determiner). In some embodiments, z(t) are one-hot encoded vectors of time-based features indicating month, week, day, day of month, weekday, hour, minute. Second input x(t) comprises a second input—for example, server telemetry/logging data (e.g., from server telemetry and could be a multivariate time series of server telemetry/logging data). First input z(t) is processed by input layer 402 and neuron layer(s) 404. In some embodiments, neuron layer(s) 404 are separately pre-trained on thread usages so they learn and encode the seasonality of thread usage and are then inserted into the main network model 400, where they are "frozen", i.e. the parameters of these layers are not allowed to change during training of the full model 400. Neuron layer(s) 404 comprises one or more neuron layers for data processing—for example, a feedforward neuron layer, a recurrent neuron layer, a long short term memory layer, a dense layer, a dropout layer, etc. Neuron layer(s) 404 feed into neuron layer(s) 410. The layer(s) of neuron layer(s) 404 comprise an output function, for example a rectified linear output function or a tan h output function. The layers of neuron layer(s) 404 comprise any appropriate number of neurons, for example 32 neurons, 64 neurons, 128 neurons, etc. Second input x(t) is processed by input layer 406 and neuron layer(s) 408. Neuron layer(s) 408 comprises one or more neuron layers for data processing, for example, a feedforward neuron layer, a recurrent neuron layer, a long short term memory layer, a dense layer, a dropout layer, etc. Neuron layer(s) 408 feed into neuron layer(s) 410. The layer(s) of neuron layer(s) 408 comprise an output function, for example a rectified linear output function or a tan h output function. The layers of neuron layer(s) 408 comprise any appropriate number of neurons, for example 32 neurons, 64 neurons, 128 neurons, etc. Inputs from neuron layer(s) 404 and neuron layer(s) 408 are combined and processed by neuron layer(s) 410. Neuron layer(s) 410 comprises one or more neuron layers for data processing, for example, a feedforward neuron layer, a recurrent neuron layer, a long short term memory layer, a dense layer, a dropout layer, etc. Neuron layer(s) 410 feed into output layer 412. The layer(s) of neuron layer(s) 410 comprise an output function, for example a rectified linear output function or a tan h output function. The layers of neuron layer(s) 410 comprise any appropriate number of neurons, for example 32 neurons, 64 neurons, 128 neurons, etc. When appropriate, different layers of neuron layer(s) 410 comprise different numbers of neurons. Output layer 412 comprises a number of neurons appropriate to control a resource provisioning. For example, output layer 412 comprises three neurons, a first neuron for indicating to increase the resource provisioning, a second neuron for indicating to maintain the resource provisioning, and a third neuron for indicating to reduce the resource provisioning.

Model 400 additionally receives training data. Training data comprises data for training model 400 (e.g., to make correct decisions). For example, training data comprises a resource utilization score received from a resource utilization score determiner. Model 400 is trained in one or more ways, include using reinforcement learning using a resource utilization score and a provisioner performance reward, pre-training training neural network layer(s) 404 using seasonal job request data and then freezing these before training the full network, or training using supervised learning with historical data.

Figure 5:
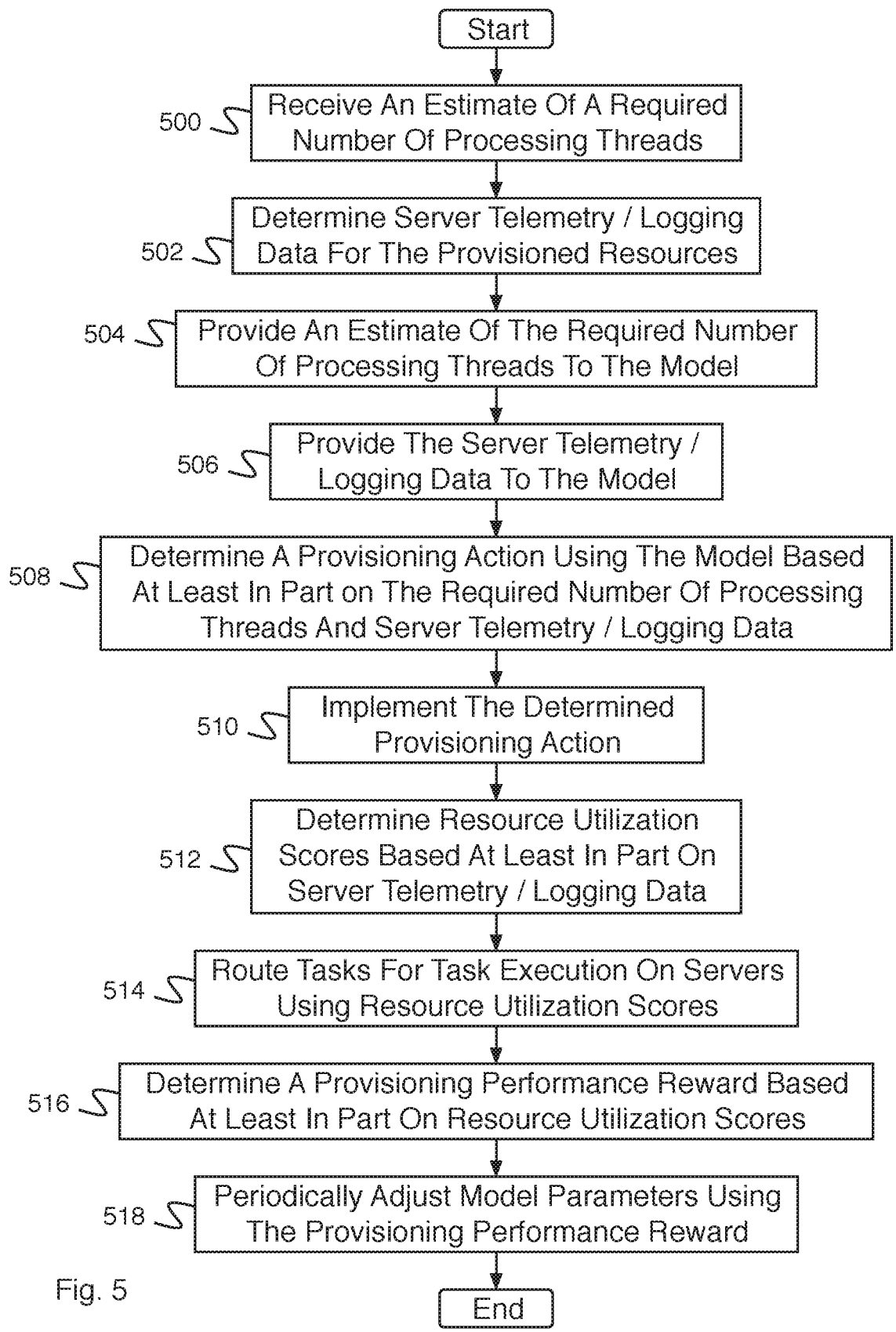
FIG. 5 is a flow diagram illustrating an embodiment of a process for automatically scaling provisioned resources.

FIG. 5 is a flow diagram illustrating an embodiment of a process for automatically scaling provisioned resources. In some embodiments, the process of FIG. 5 is executed by provisioning system 208 of FIG. 2. In the example shown, in 500, an estimate of a required number of processing threads is received. In 502, server telemetry/logging data is determined for the provisioned resources. In 504, an estimate of the required number of processing threads is provided to the model. In 506, server telemetry/logging data is provided to the model. In 508, a provisioning action is determined using the model based at least in part on the required number of processing threads and server telemetry/logging data. In 510, the provisioning action is implemented. In 512, resource utilization scores are determined based at least in part on the server telemetry/logging data. In 514, tasks are routed for task execution on servers using resource utilization scores. In 516, a provisioning performance reward is determined based at least in part on resource utilization scores. In 518, the model parameters of the model are periodically adjusted using the provisioning performance reward.

Figure 6:
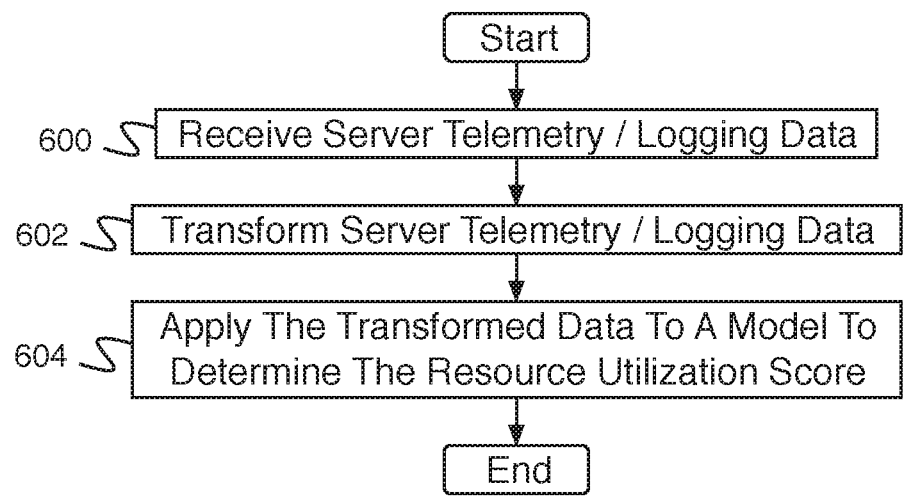
FIG. 6 is a flow diagram illustrating an embodiment of a process for determining server telemetry/logging data and calculation of the resource utilization score

FIG. 6 is a flow diagram illustrating an embodiment of a process for determining server telemetry/logging data and calculation of the resource utilization score for provisioned resources. In some embodiments, the process of FIG. 6 implements 512 of FIG. 5. In the example shown, in 600, server telemetry/logging data is received. For example, server telemetry/logging data is received from provisioned resources (e.g., servers) of a server pool. In 602, server telemetry/logging data is transformed. For example, server telemetry/logging data is aggregated, server telemetry/logging data is scaled, a server telemetry/logging data statistic is computed, server telemetry/logging data is transformed using a nonlinear function (e.g., log, square root, exponential, etc.), etc. In 604, the transformed data is applied to a model to determine the resource utilization score. For example, the model comprises a neural network, a machine learning model, an analytical model, etc.

Figure 7:
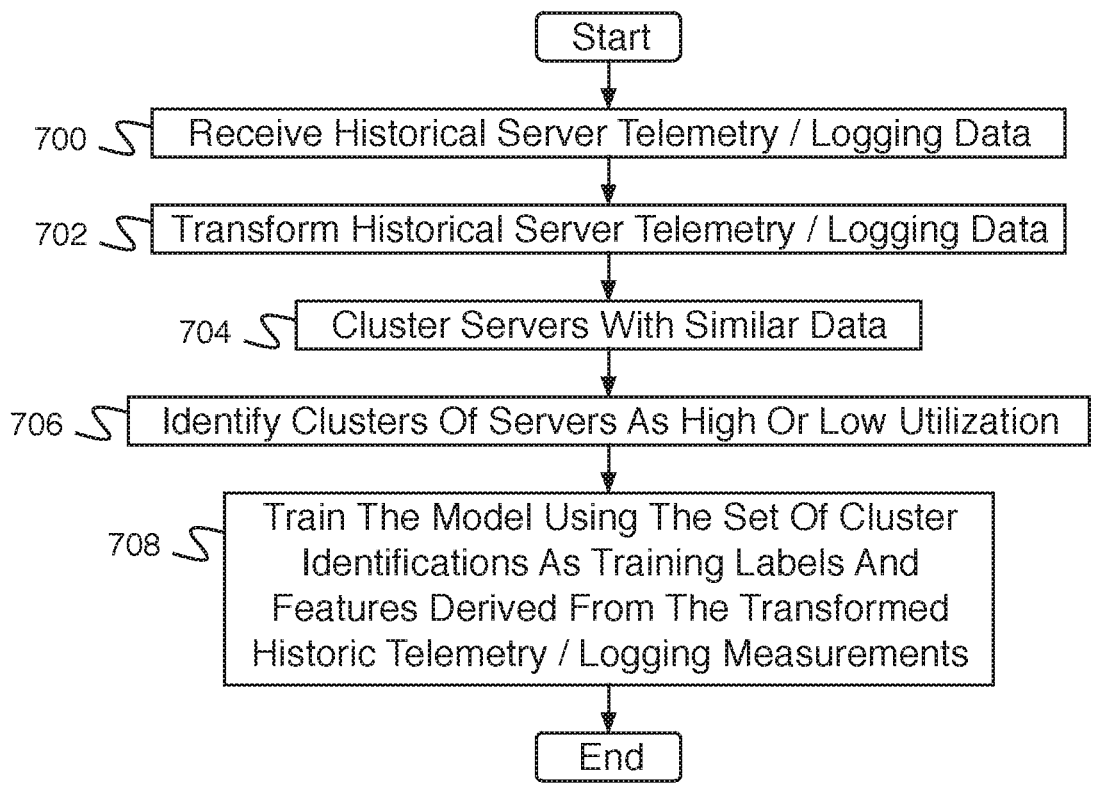
FIG. 7 is a flow diagram illustrating an embodiment of a process for training a model.

FIG. 7 is a flow diagram illustrating an embodiment of a process for training a model. In some embodiments, the process of FIG. 7 comprises a process for training the model of 604 of FIG. 6. In the example shown, in 700, historical server telemetry/logging data is received. In 702, the historical server telemetry/logging data is transformed. For example, the historical server telemetry/logging data is transformed using the same transformation as is used in 602 of FIG. 6. In 704, servers with similar data are clustered. For example, servers with similar values for server telemetry/logging measurements, etc. are clustered. In 706, clusters of servers are identified as high or low utilization. For example, a utilization score is assigned to each cluster of servers based at least in part on the server telemetry/logging measurements as transformed in step 702; this set of cluster identifications comprise identified utilization scores (e.g., high, medium, low, or numerical gradation scores) that are later used as training labels in a supervised machine learning problem. In 708, the model is trained using the set of cluster identifications as training labels and features derived from the transformed historic telemetry/logging measurements. For example, historic telemetry/logging measurements are transformed (e.g., in step 702) and used along with the associated historic utilization of resources to train a model so that utilization can be determined by inputting current measured telemetry/logging measurements.

Figure 8:
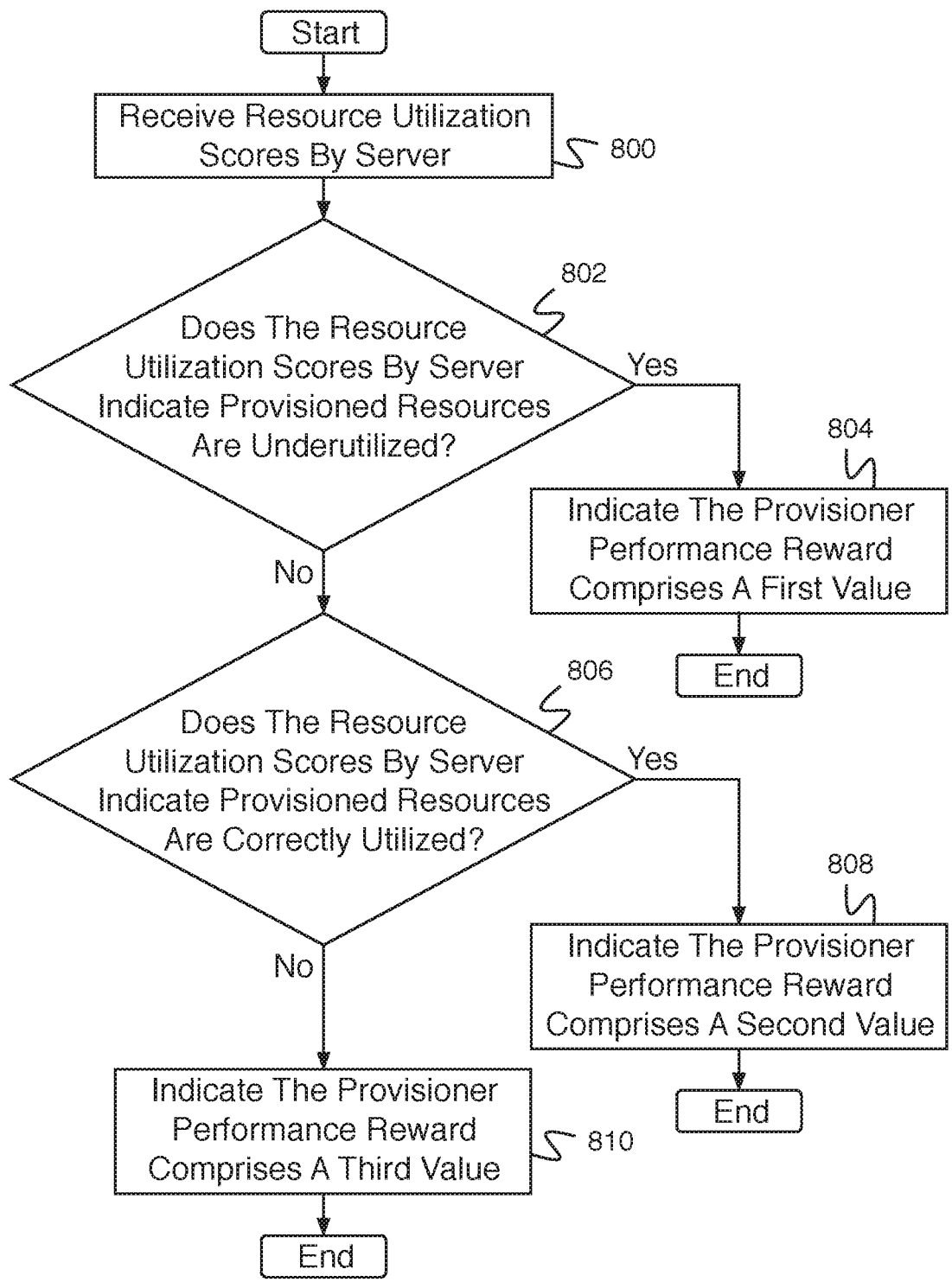
FIG. 8 is a flow diagram illustrating an embodiment of a process for determining a provisioning performance reward based at least in part on the resource utilization score.

FIG. 8 is a flow diagram illustrating an embodiment of a process for determining a provisioning performance reward based at least in part on the resource utilization score. In some embodiments, this reward can be used in a reinforcement learning algorithm to train a provisioning system (e.g., provisioning system 300 of FIG. 3). In some embodiments, the process of FIG. 8 implements 516 of FIG. 5. In the example shown, in 800, resource utilization scores by server are received. In 802, it is determined whether the resource utilization scores by server indicate that provisioned resources are underutilized. In the event it is determined that the resource utilization scores by server indicate that provisioned resources are underutilized, control passes to 804. In 804, the process indicates that the provisioner performance reward comprises a first value, and the process ends. For example, the first value comprises a small negative value. In the event it is determined in 802 that the resource utilization scores by server do not indicate provisioned resources are underutilized, control passes to 806. In 806, it is determined whether the resource utilization scores by server indicate that provisioned resources are correctly utilized. In the event it is determined that the resource utilization scores by server indicate that provisioned resources are correctly utilized, control passes to 808. In 808, the process indicates that the provisioner performance reward comprises a second value, and the process ends. For example, the second value comprises a positive value. In the event it is determined in 806 that the resource utilization scores by server do not indicate that provisioned resources are correctly utilized, control passes to 810. For example, determining that the resource utilization scores by server do not indicate provisioned resources are underutilized and determining that the resource utilization scores by server do not indicate that provisioned resources are correctly utilized comprises determining that the resource utilization scores by server indicate provisioned resources are overutilized. In 810, the process indicates that the provisioner performance reward comprises a third value. For example, the third value comprises a large negative value.

In various embodiments, the provisioner performance reward comprises a continuous function, a discontinuous function, a linear function, a nonlinear function, a symmetric function, an asymmetric function, a piecewise function, or any other appropriate function of the resource utilization scores by server.

Figure 9:
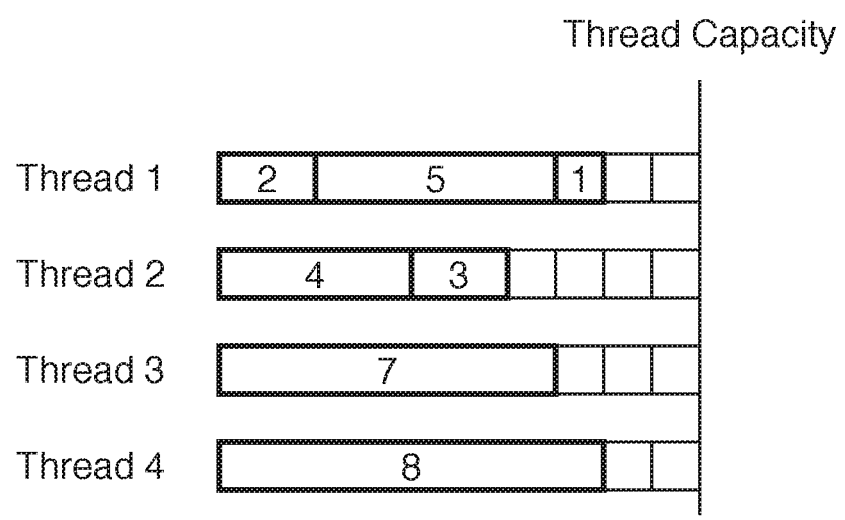
FIG. 9 is a diagram illustrating an embodiment of a first fit packing algorithm.

FIG. 9 is a diagram illustrating an embodiment of a first fit packing algorithm. In some embodiments, the first fit packing algorithm is used by a required threads determiner (e.g., required threads determiner 302 of FIG. 3). In the example shown, the first fit packing algorithm is used to pack tasks into a set of threads. Tasks are arranged in an ordered task queue. In the example shown, the ordered task queue comprises threads of size 2, 5, 4, 7, 1, 3, and 8, and they are to be packed into a set of threads of capacity 10. The packing algorithm is to place each task in the first available thread with room for it. The first task, of size 2, is placed in thread 1, leaving a remaining capacity of 8 in thread 1. The second task, of size 5, is placed in thread 1, leaving a remaining capacity of 3 in thread 1. The third task, of size 4, cannot be placed in thread 1, so it is placed in thread 2, leaving a remaining capacity of 6 in thread 2. The fourth task, of size 7, cannot be placed in thread 1 or 2, so it is placed in thread 3, leaving a remaining capacity of 3 in thread 3. The fifth task, of size 1, is placed in thread 1, leaving a remaining capacity of 2 in thread 1. The sixth task, of size 3, cannot be placed in thread 1, so it is placed in thread 2, leaving a remaining capacity of 3 in thread 2. The seventh and final task, of size 8, cannot be placed in thread 1, 2, or 3, so it is placed in thread 4, leaving a remaining capacity of 2 in thread 4.

Figure 10:
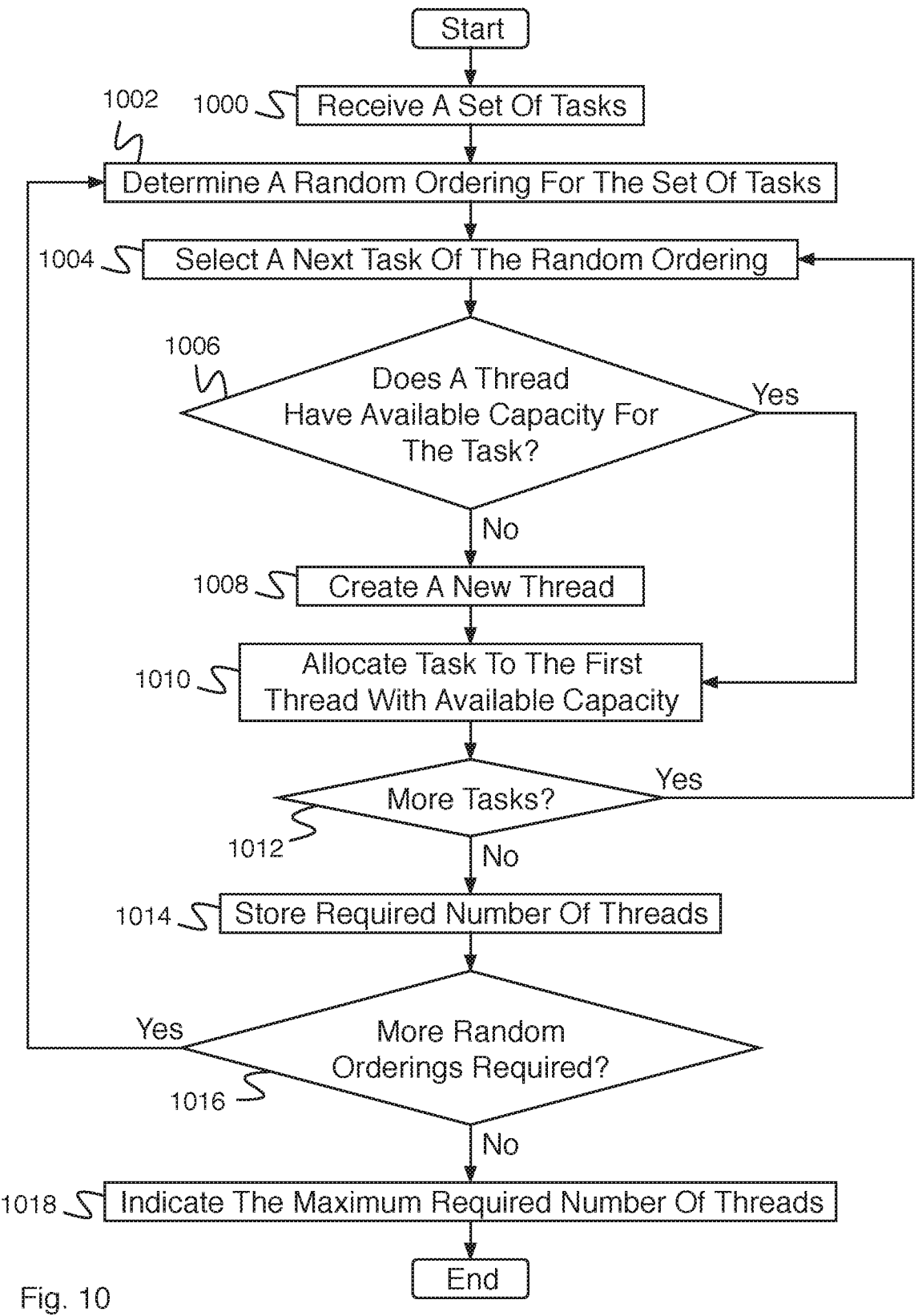
FIG. 10 is a flow diagram illustrating an embodiment of a process for determining a required number of threads using a first fit packing algorithm.

FIG. 10 is a flow diagram illustrating an embodiment of a process for determining a required number of threads using a first fit packing algorithm. In some embodiments, the process of FIG. 10 is used by a required threads determiner (e.g., required threads determiner 302 of FIG. 3). In the example shown, in 1000, a set of tasks is received. In 1002, a random ordering for the set of tasks is determined. In 1004, a next task of the random ordering is selected. In some embodiments, the next task of the random ordering comprises the first task of the random ordering. In 1006, it is determined if a thread has available capacity for the task. In the event it is determined that a thread does not have available capacity for the task, control passes to 1008. In 1008, a new thread is created. For example, a new empty thread is created. The new thread is created at the end of the set of threads (e.g., the new thread comprises the last thread). Control then passes to 1010. In the event it is determined in 1006 that a thread has available capacity for the task, control passes to 1010. In 1010, the task is allocated to the first thread with available capacity. In 1012, it is determined whether there are more tasks. For example, it is determined whether there are more tasks of the set of tasks in the most recently determined random ordering. In the event it is determined that there are more tasks, control passes to 1004. In the event it is determined that there are not more tasks, control passes to 1014. In 1014, the required number of threads is stored. For example, the number of threads required by the packing algorithm for the most recently determined random ordering of tasks is stored. In 1016, it is determined whether more random orderings are required. For example, a predetermined number of random orderings are required (e.g., 10 random orderings, 100 random orderings, 500 random orderings, etc.). In the event it is determined that more random orderings are required, control passes to 1002. In the event it is determined that more random orderings are not required, control passes to 1018. In 1018, the maximum required number of threads is indicated. For example, the maximum of the required number of threads stored in 1014 over the set of random orderings is indicated. In some embodiments, only a running maximum is stored (e.g., in 1014 the required number of threads is indicated as the maximum stored if and only if it is larger than a previous maximum number of threads).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for automatically scaling provisioned resources, comprising:
   an input interface configured to:

receive an indication to execute a set of tasks; and
a processor configured to:
   determine a required number of processing threads for the set of tasks, comprising to:
      randomly order the set of tasks to obtain an ordered set of tasks;
      allocate a first task of the ordered set of tasks to a first processing thread of a set of processing threads;
      determine whether at least one processing thread of the set of processing threads has an available capacity for a next processing task of the ordered set of processing tasks;
      in response to determining that no processing thread of the set of processing threads has the available capacity for the next processing task, create a new processing thread of the set of processing threads and allocate the next processing task to the new processing thread; and
      in response to determining that there are no more tasks of the ordered set of tasks to allocate to the set of processing threads, indicate the required number of processing threads for the set of tasks is a count of the processing threads in the set of processing threads;
   determine required resources for processing the required number of processing threads using a model;
   provision the required resources;
   indicate to execute client tasks using the provisioned resources;
   determine server telemetry or logging data for the provisioned resources;
   provide the server telemetry or the logging data to the model;
   determine a resource utilization score based at least in part on the server telemetry or the logging data;
   determine a provisioning performance reward based at least in part on the resource utilization score; and
   adjust model parameters using the provisioning performance reward.

2. The system of claim 1, wherein indicating to execute client tasks causes the client tasks to execute.

3. The system of claim 1, wherein the required number of processing threads comprises a required number of processing threads for a server type of a plurality of server types.

4. The system of claim 1, wherein the client tasks comprise client tasks for a client of a plurality of clients.

5. The system of claim 1, wherein the resource utilization score is based at least in part on a nonlinear function of the performance metric data.

6. The system of claim 1, wherein the resource utilization score is based at least in part on asymmetric function of the server telemetry or the logging data.

7. The system of claim 1, wherein the provisioner performance reward comprises:
   a first value in response to the resource utilization score indicating the provisioned resources are underutilized;
   a second value in response to the resource utilization score indicating the provisioned resources are correctly utilized; and
   a third value in response to the resource utilization score indicating the provisioned resources are overutilized.

8. The system of claim 1, wherein a next determination of required resources is based at least in part on the server telemetry or the logging data provided to the model.

9. The system of claim 1, wherein the model comprises a neural network.

10. The system of claim 9, wherein the neural network comprises one or more of: a neuron layer, a plurality of neuron layers, a dense neuron layer, a dropout neuron layer, a feedforward layer, a recurrent layer, a long short term memory layer, a rectified linear unit activation function, or a tan h activation function.

11. The system of claim 1, wherein adjusting the model using the resource utilization score comprises using reinforcement learning.

12. The system of claim 1, wherein the estimate of the required number of processing threads is based at least in part on historical usage data.

13. The system of claim 1, wherein a determination of required resources is made at a regular interval.

14. The system of claim 13, wherein the regular interval comprises every minute, every 5 minutes, every 10 minutes, or every hour.

15. The system of claim 1, wherein determining the server telemetry or the logging data comprises determining a set of performance metrics.

16. The system of claim 15, wherein determining the server telemetry or the logging data comprises processing the set of performance metrics.

17. The system of claim 16, wherein processing the set of performance metrics comprises one or more of: scaling one or more performance metrics, computing a linear function of one or more performance metrics, aggregating performance metrics, computing a nonlinear function of one or more performance metrics, thresholding one or more performance metrics, processing the set of performance metrics using a model, processing the set of performance metrics using a machine learning model, or processing the set of metrics using a neural network.

18. The system of claim 1, wherein in response to determining that at least one processing thread of the set of processing threads has the available capacity for the next processing task of the ordered set of processing tasks, allocate the next processing thread to one processing thread of the at least one processing thread.

19. A method for automatically scaling provisioned resources, comprising:
   receiving an indication to execute a set of tasks;
   determining a required number of processing threads for the set of tasks, comprising to:
      randomly ordering the set of tasks to obtain an ordered set of tasks;
      allocating a first task of the ordered set of tasks to a first processing thread of a set of processing threads;
      determining whether at least one processing thread of the set of processing threads has an available capacity for a next processing task of the ordered set of processing tasks;
      in response to determining that no processing thread of the set of processing threads has the available capacity for the next processing task, creating a new processing thread of the set of processing threads and allocating the next processing task to the new processing thread; and
      in response to determining that there are no more tasks of the ordered set of tasks to allocate to the set of processing threads, indicating the required number of processing threads for the set of tasks is a count of the processing threads in the set of processing threads;
   determining, using a processor, required resources for processing the required number of processing threads using a model;

provisioning the required resources;
indicating to execute client tasks using the provisioned resources;
determining server telemetry or logging data for the provisioned resources;
providing the server telemetry or the logging data to the model;
determining a resource utilization score based at least in part on the server telemetry or the logging data;
determining a provisioning performance reward based at least in part on the resource utilization score; and
adjusting model parameters using the provisioning performance reward.

20. A computer program product for automatically scaling provisioned resources, the computer program product being embodied in a non-transitory computer readable storage medium and comprising computer instructions for:
receiving an indication to execute a set of tasks;
determining a required number of processing threads for the set of tasks, comprising to:
 randomly ordering the set of tasks to obtain an ordered set of tasks;
 allocating a first task of the ordered set of tasks to a first processing thread of a set of processing threads;
 determining whether at least one processing thread of the set of processing threads has an available capacity for a next processing task of the ordered set of processing tasks;
 in response to determining that no processing thread of the set of processing threads has the available capacity for the next processing task, creating a new processing thread of the set of processing threads and allocating the next processing task to the new processing thread; and
 in response to determining that there are no more tasks of the ordered set of tasks to allocate to the set of processing threads, indicating the required number of processing threads for the set of tasks is a count of the processing threads in the set of processing threads;
determining required resources for processing the required number of processing threads using a model;
provisioning the required resources;
indicating to execute client tasks using the provisioned resources;
determining server telemetry or logging data for the provisioned resources;
providing the server telemetry or the logging data to the model;
determining a resource utilization score based at least in part on the server telemetry or the logging data;
determining a provisioning performance reward based at least in part on the resource utilization score; and
adjusting model parameters using the provisioning performance reward.

\* \* \* \* \*